(12) United States Patent
Mukkamalla et al.

(10) Patent No.: US 7,031,987 B2
(45) Date of Patent: Apr. 18, 2006

(54) INTEGRATING TABLESPACES WITH DIFFERENT BLOCK SIZES

(75) Inventors: Sreedhar Mukkamalla, San Mateo, CA (US); Arvind Nithrakashyap, San Mateo, CA (US); Tirthankar Lahiri, Santa Clara, CA (US); Alok Pareek, Brisbane, CA (US); Juan R. Loaiza, San Carlos, CA (US); J. William Lee, Foster City, CA (US); Gary C. Ngai, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 09/871,476

(22) Filed: May 30, 2001

(65) Prior Publication Data
US 2002/0143733 A1    Oct. 3, 2002

Related U.S. Application Data

(63) Continuation-in-part of application No. 09/675,195, filed on Sep. 29, 2000, and a continuation-in-part of application No. 08/865,693, filed on May 30, 1997, now Pat. No. 6,272,503.

(51) Int. Cl.
*G06F 7/00* (2006.01)

(52) U.S. Cl. ................ 707/204; 707/101; 707/8

(58) Field of Classification Search ........ 707/200–206, 707/3, 7, 509, 513, 530, 1–10, 100–102, 707/104.1; 711/1–3, 202, 206, 209; 715/513, 715/530
See application file for complete search history.

(56) References Cited

U.S. PATENT DOCUMENTS

| | | | | |
|---|---|---|---|---|
| 5,491,810 A | * | 2/1996 | Allen | 711/117 |
| 5,687,343 A | * | 11/1997 | Fecteau et al. | 711/202 |
| 5,717,915 A | * | 2/1998 | Stolfo et al. | 707/5 |
| 5,758,345 A | * | 5/1998 | Wang | 707/100 |
| 5,787,471 A | * | 7/1998 | Inoue et al. | 711/133 |
| 5,819,298 A | * | 10/1998 | Wong et al. | 707/205 |
| 5,822,749 A | * | 10/1998 | Agarwal | 707/2 |
| 5,832,509 A | * | 11/1998 | Mortis et al. | 707/200 |
| 5,870,746 A | * | 2/1999 | Knutson et al. | 707/101 |
| 5,890,167 A | | 3/1999 | Bridge, Jr. et al. | |

(Continued)

OTHER PUBLICATIONS

Claus Hagen, et al., "Highly Available Process Support Systems: Implementing Backup Mechanisms," 1999, IEEE, pp. 112-121.

(Continued)

*Primary Examiner*—Greta Robinson
*Assistant Examiner*—Miranda Le
(74) *Attorney, Agent, or Firm*—Hickman Palermo Truong & Becker, LLP (57) ABSTRACT

Provided herein is a mechanism that allows a given database system to access data blocks from another database system, where data blocks from the given database system and data blocks from the other database system have different sizes. According to an aspect of the present invention, a tablespace in the other database system contained the data blocks. The tablespace is detached from the other database system and integrated into the given database, which is capable of processing data stored in data blocks of a different sizes.

16 Claims, 5 Drawing Sheets

U.S. PATENT DOCUMENTS

| | | | |
|---|---|---|---|
| 5,890,169 A | * | 3/1999 | Wong et al. ................ 707/206 |
| 5,970,502 A | * | 10/1999 | Salkewicz et al. .......... 707/201 |
| 6,032,158 A | * | 2/2000 | Mukhopadhyay et al. .. 707/201 |
| 6,035,298 A | * | 3/2000 | McKearney ................. 707/10 |
| 6,035,412 A | * | 3/2000 | Tamer et al. ................... 714/6 |
| 6,101,497 A | * | 8/2000 | Ofek ........................... 707/10 |
| 6,122,636 A | | 9/2000 | Malloy et al. |
| 6,247,008 B1 | * | 6/2001 | Cambot et al. ................ 707/3 |

OTHER PUBLICATIONS

IBM Corp., "Conditional Container Reuse for Database and Tablespace Restore," IBM Technical Disclosure Bulletin, vol. 39, No. 12, Dec. 1996, XP-002240529, pp. 199-200.

R. W. Dey, et al., IBM Corp., "Data Space Manager," IBM Technical Disclosure Bulletin, vol. 25, No. 11A, Apr. 1983, XP-000714243, pp. 5456-5459.

* cited by examiner

INTEGRATING TABLESPACES WITH DIFFERENT BLOCK SIZES

RELATED APPLICATIONS

The present application is a continuation-in-part of and claims priority to U.S. application Ser. No. 08/865,693, entitled "Tablespace-Relative Database Pointers", filed on May 30, 1997 by William H. Bridge, Jr., et al., now U.S. Pat. No. 6,272,503, the contents of which are herein incorporated by reference and referred to as Tablespace-Relative Database Pointers.

The present application is a continuation-in-part of and claims priority to U.S. application Ser. No. 09/675,195, entitled "Using Transportable Tablespaces for Hosting Data of Multiple Users", filed on Sep. 29, 2000, by Juan R. Loaiza, et al., the contents of which are herein incorporated by reference.

The present application is related to U.S. application Ser. No. 08/852,968, entitled "Pluggable Tablespaces", filed on May 8, 1997, by William H. Bridge Jr., et al., the contents of which are herein incorporated by reference and referred to as Pluggable Tablespaces.

FIELD OF THE INVENTION

The present invention relates to database systems, and in particular, to techniques for efficiently moving data between database systems.

BACKGROUND OF THE INVENTION

The ability to store and retrieve large amounts of data are some of the most important functions of computers in today's society. To carry out these functions, database systems are typically used to retrieve and store data in databases. Database systems have performed these functions very successfully, creating for society the ability to retrieve data at speeds and quantities previously unimagined, and bestowing onto society an unprecedented level of access to information. The success of database systems has unleashed an insatiable demand for even faster and more efficient database systems that process even greater quantities of data.

One mechanism that provides efficient access to large amounts of data is a data warehouse. A data warehouse represents a transformation of raw data. The raw data used by the warehouse typically comes from a "source" database system, such as an online transaction processing ("OLTP") database. The OLTP database system is oriented towards the "real time" operation of a business, while the data warehouse is oriented toward answering longer range, management oriented, questions about the business. To stay current, the data warehouse house is periodically updated with information from the OLTP database system. These updates entail transfers of large quantities of data.

A conventional technique for transferring data is the command generation technique. Under the command generation technique, an "exporting" database system generates a file of insert commands. The insert commands conform to a database language, such as the structured query language ("SQL"). For each record being exported, an insert command specifies the creation of a record with the values needed to generate a copy of the record being exported. To import the data, an "importing" database system, which is capable of executing commands written in the database language, scans the file, executing each insert command.

Executing an insert command for each record to export is typically a slow process, one which may span days for larger databases. While data is being exported, access to the data is restricted. Consequently, the database user, who requires access to the data, may be significantly impacted. Thus, conventional techniques for exporting data may be significantly burdensome.

Another conventional technique for moving data into a data warehouse involves the use of tools available in applications used to manage data warehouses. These tools transfer data between a source database and a data warehouse using a process that has three stages: extracting data from the source database system, transforming the extracted data, and loading the transformed data into the data warehouse. These stages are referred to collectively as ETL, which stands for extraction, transformation, and loading. In general, ETL tools extract data from a source database system by issuing queries to the source database system to retrieve data. ETL tools load data in the data warehouse by issuing insert commands to the data warehouse to load the data retrieved from the source database system. While the use of ETL tools may be more efficient than the command generation technique, the process of transferring data may still require undesirably long periods of time.

A novel technique that is much more efficient than the conventional techniques for transferring data is referred to as transportable tablespaces. A tablespace is a collection of storage containers (e.g. data files) used to store data for database objects. Database objects are objects managed by a database system. Transportable tablespaces is a technique that allows tablespaces to be copied and integrated into another database system, or in other words, "plugged into" the other database system. This capability allows data to be copied using operating system utilities for copying files, which run much faster than the process of extracting and loading data by executing queries and insert statements.

Unfortunately, it is not always possible to plug in a tablespace from one database system to another because the database systems may not be configured to handle the same data block size. A data block is an atomic unit of storage space allocated to store one or more database records (e.g. rows). Typically, a database system is configured to operate upon a database composed of data blocks of one particular size. In some systems, the particular size may be configured by a user when a database is created. Once a database is created, however, the data block size may not be changed. Consequently, a tablespace composed of data blocks of a given size may not be plugged into a database system that expects data blocks of a different block size.

It is possible to overcome this limitation by managing the data block sizes of both the data warehouse and its source database systems. The source database system and the data warehouse may be configured for the same data block size. However, for purposes of efficiency, it is usually desirable to have larger block sizes for data warehouses and smaller block sizes for OLTP systems. For this reason, data warehouses typically have larger block sizes than OLTP systems.

Based on the foregoing, it is clearly desirable to provide a mechanism that allows a tablespace or any collection of data blocks of a given size to be plugged into a database system that operates on data blocks of a different size.

SUMMARY OF THE INVENTION

Described herein is a mechanism that allows a given database system to access data blocks from another database system, where the data blocks from the given database system and data blocks from the other database system have different sizes. According to an aspect of the present invention, the data blocks in the other database system are contained in a tablespace. The tablespace is detached from the other database system and integrated into the given database, which is capable of processing data stored in data blocks of different sizes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for transferring data between databases is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Described herein is a mechanism that allows a given database system to access data blocks from another database system, where data blocks from the given database system and data blocks from the other database system have different sizes. According to an embodiment of the present invention, the techniques involve the use of a database system that handles databases with data blocks that have different sizes. These techniques are illustrated using an exemplary database system.

Exemplary Database System

Figure 1:
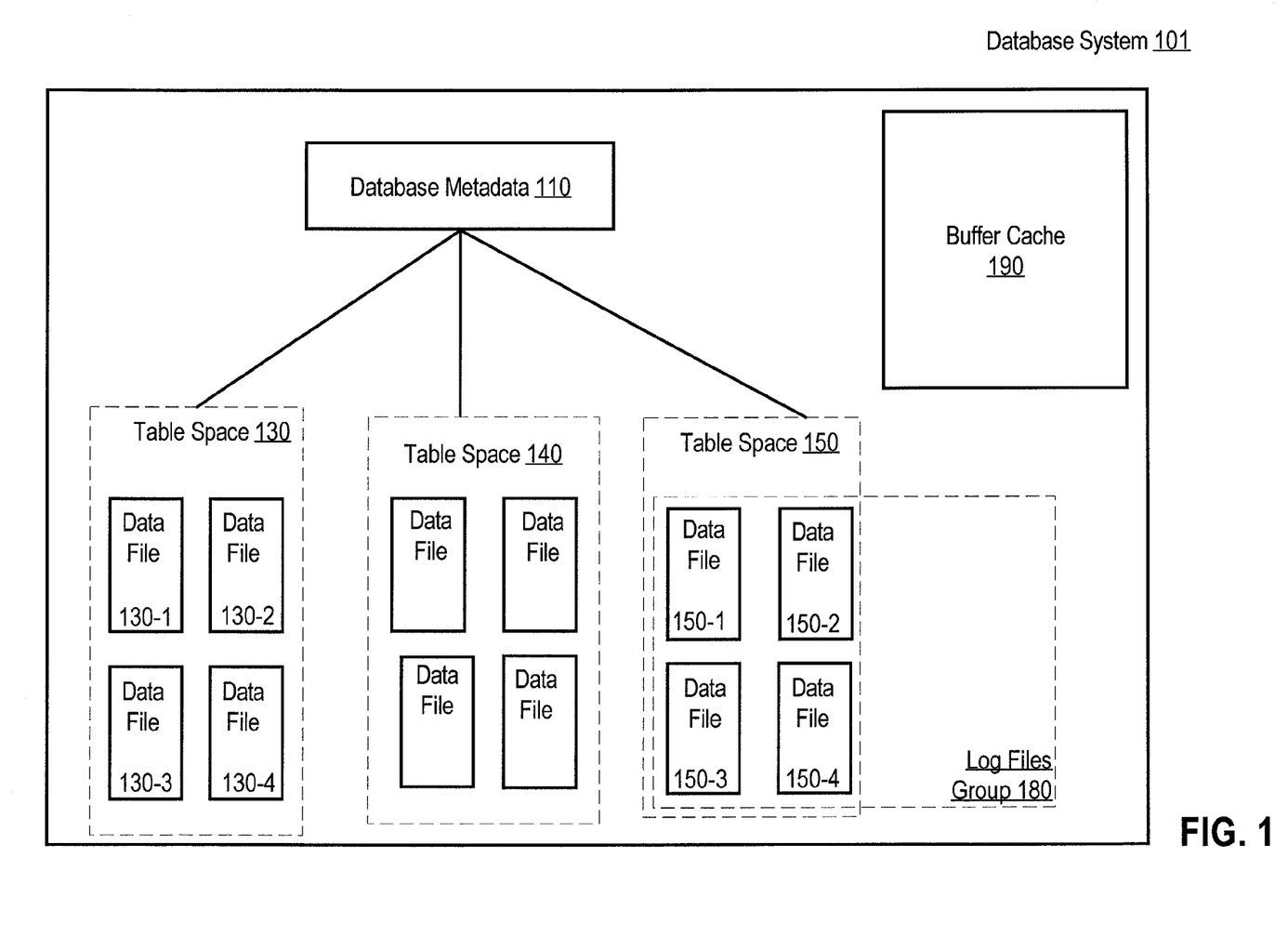
FIG. 1 is a block diagram of a database system used to illustrate an embodiment of the present invention.

FIG. 1 is a block diagram that provides an overview of an exemplary database system used to illustrate an embodiment of the present invention. Database system 101 processes and stores data in database objects. Database objects are objects managed by a database system for the purpose of storing, retrieving, and processing data. Examples of database objects include tables, indexes, and code modules which may be executed by a database system. Typically, the database objects are stored in static storage, in one or more data blocks in a data file.

Database system 101 performs operations to data in a database object by performing operations on data blocks that hold the data. Operations on data blocks are carried out on copies of data blocks read into buffer cache 190 from static storage. Copies of the data blocks are stored in buffers in the buffer cache 190. The buffers are shared by all user processes concurrently connected to database system 101. A copy of a data block is loaded into buffer cache 190 whenever database system 101 performs an operation involving a data item stored in the data block, such as a row in a table. If the operation changes the data item, the change is made to the copy of the data block stored in buffer cache 190. Afterwards, a database writer writes the modified blocks of data from buffer cache 190 to the data files on disk.

Data for a particular set of database objects may be stored in space allocated from one or more tablespaces, such as tablespaces 130, 140, and 150. A tablespace is a collection of storage containers (e.g. data files) used to store data for database objects. For example, tablespace 130 contains data files 130-1 to 130-4. A database object maybe referred to as being in a particular tablespace when the tablespace holds data for the database object.

Database metadata 110 is metadata that describes the configuration of a database system. Database metadata 110 defines, for example, database objects (e.g. tables and indexes for tables), tablespaces, and what tablespaces to use to store data for a table or index. Database metadata is generated in response to receiving data definition commands from a user. A user issues database commands to a database system to modify the configuration of a database system to define, for example, the database objects in the database system, the attributes of database objects, and the tablespaces that hold data for the database objects. Data definition commands must conform to a data definition language recognized by a database system, such as SQL.

Database system 101 may encounter problems that can halt the operation of a database or affect the writing of database information to disk. Common types of failures include process failures, involving a failure in a user, server, or background process of a database instance, or media failures, involving a physical problem reading or writing physical files needed for normal database operation. A major aspect of database operation and administration involves the recovery of the database from the various types of failures encountered.

One mechanism that database system 101 uses to manage recovery from failures is a logging mechanism. A logging mechanism entails recording all changes made to a database system by maintaining a log for the database system. Several different operation logs are maintained to perform various database maintenance functions. Specifically, a redo log is used to store database operations so that the operations can be re-performed to restore the database to its pre-failure state after a failure. For example, when a transaction modifies data in the buffer cache 190, a redo entry that specifies the modification is stored in a redo log on disk. If a failure occurs before the updated data within the buffer cache has been stored to disk, the modified data in the buffer cache 190 may be lost. Under these conditions, during the recovery process, the database may be modified to include the lost change based on the redo entry.

The basic component of a log system is a group of one or more log files used to store redo and undo entries. Log files group 180 includes data files 150-1 to 150-4 in tablespace 150. Redo and undo entries store low-level representations of database changes. Redo entries contain the information necessary to redo changes made by data operations such as INSERT, UPDATE, DELETE, CREATE, ALTER, or DROP. Conversely, undo entries contain the information necessary to undo changes made by data operations. The redo or undo entries in the redo log file group in static storage are referred to as redo logs.

Using Transportable Tablespaces

Transportable tablespaces refers to a technique for transferring data between database systems that is based on integrating copies of tablespaces from a "source database system" into a "target database system". Integrating a copy of a tablespace involves altering the database metadata of the target database by modifying or adding data to define the tablespace as any other tablespace used by the database system, as shall be described in greater detail. Examples of techniques for integrating tablespaces are described in Pluggable Tablespaces and Tablespace-Relative Database Pointers.

The database metadata may be altered using a variety of techniques. Utilities available on the source database system may be executed to export the metadata into an "export control file", and utilities on the target database system may be executed to reconstruct metadata from the export control file. Alternately, exported metadata could be included with the data being transported in the tablespace, and the target database would reconstruct the metadata from the data included in the tablespace. A user could manually reconstruct the metadata on the target database system. Finally, utilities on the source database system could examine the data in the tablespaces to derive the metadata.

The term "copy," as used herein, refers to both the source data and a duplicate of the source data. For example, a copy of a source data file may be the source data file itself, or another data file that is a duplicate generated using readily available copy utilities, such as operating system utilities for creating copies of data files.

A tablespace may be integrated into a database by detaching the tablespace from the original source database or by creating a separate copy to integrate. While the copy is being made, operations on the tablespace should be restricted to read-only operations.

If the copy of the tablespace to integrate is a detached source tablespace, then the source database may need to be configured so that the source database system no longer uses the tablespace to store data. Configuring the source database may entail altering database metadata in the source database system, by, for example, removing data defining the tablespace as part of the source database system, or setting a flag to indicate that the tablespace is no longer used.

A reason a detached tablespace or a separate copy of it is integrated is that many database systems are not configured to directly access a data file concurrently with other database systems. The term "directly access" refers to accessing data in a data container, such as data in a data file, without having to request that another database system provide the data. An example of a database system directly accessing a data container is a database system running on a computer invoking an operating system function to access a data file residing on either a disk drive connected to a bus of the computer or a disk drive connected to a server coupled to the computer via a network. An example of not directly accessing a data file is issuing a query to another database requesting data from a table.

Reference Schemes for Transportable Databases

A reference is data that indicates the location of a particular data item stored in a database. References are used by database systems in many scenarios. For example, a database system may use references in an index of a column of a table. The index maps values for the column to rows in the table containing those values. Each entry in the index maps a particular value to a row, and stores a reference to the location of the row.

A reference for a data item may contain information identifying the particular data container that contains the data item. Such information may include a database-relative file number. A database-relative file number is a number used by a database system to uniquely identify a data file relative to any other data files used by the database system. For example, a reference to a particular data item, such as a row or an object, may include a data file number of the data file containing the data block holding the data item. In addition, the reference may include an offset into the file to identify a data block's location within the file.

Unfortunately, transferring data files between database systems that use references based on database-relative file numbers creates complications. These complications stem from the fact that a database-relative file number may not be unique between database systems. A database-relative file number on one database system may be used to identify a different data file on another database system. This problem may be overcome by using several measures. First, data files transferred to another database system could be assigned new database-relative file numbers. Second, because the transferred data files may contain data objects with references holding database-relative file numbers, these references would have to be modified to reflect the newly assigned database-relative file numbers. For example, a set of data files is transferred from one database system to another database system. The data files are assigned new database-relative file numbers. The data files may hold a portion of a table and an index indexing rows in the table. The references in the index may contain database-relative file numbers that should be changed to reflect newly assigned database-relative file numbers.

Tablespace Relative Addressing Scheme

Figure 2:
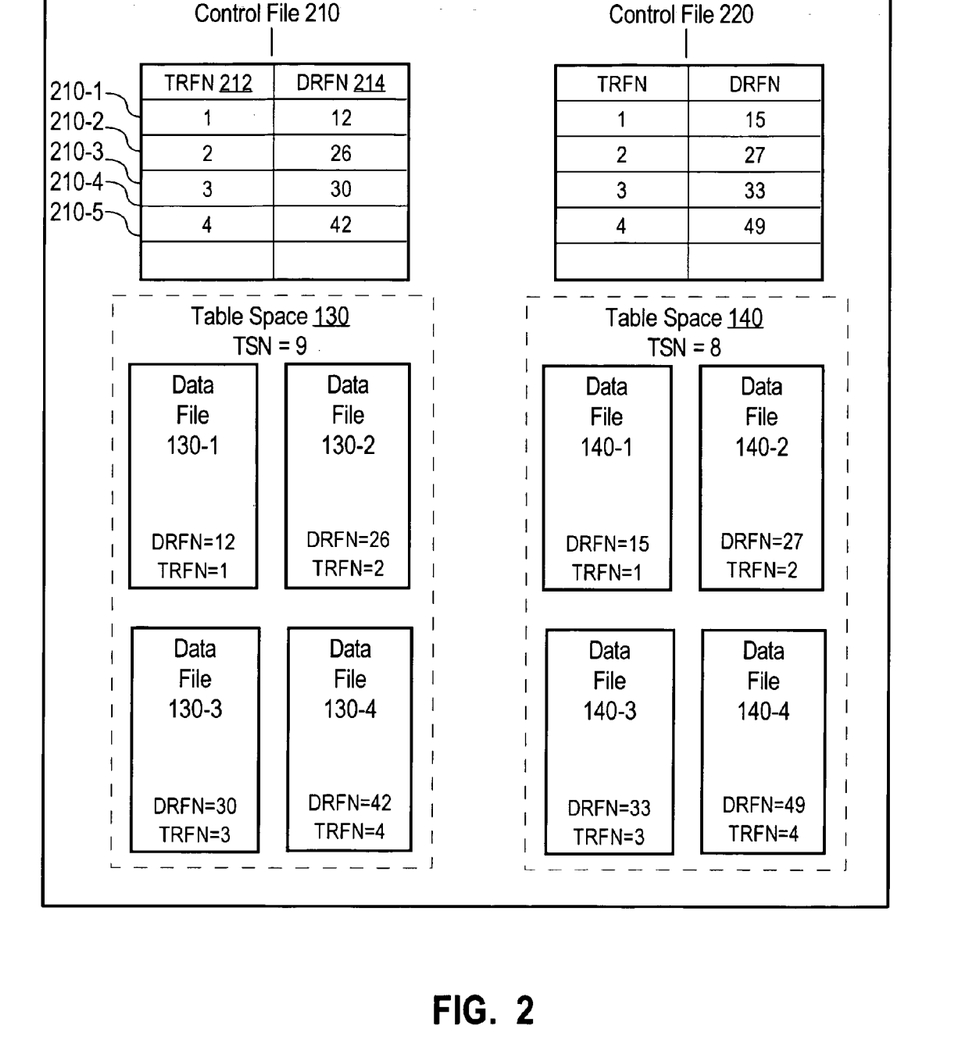
FIG. 2 is a block diagram of tablespaces and data structures used to support a relative addressing scheme according to an embodiment of the present invention.

The problem and measures attendant database-relative file numbers may be avoided by the use of a relative addressing scheme that addresses data files relative to the tablespace that contains the data file. The use of a relative addressing scheme also facilitates transportable tablespace processing, which as mentioned before, is a technique for transferring data between database systems using a process that includes moving or copying a tablespace. Examples of such techniques are described in Pluggable Tablespaces and Tablespace-Relative Database Pointers. FIG. 2 is a block diagram that depicts a relative addressing scheme used to illustrate an embodiment of the present invention. FIG. 2 illustrates identifiers used to identify tablespaces and data files, and the relationship between them, and other elements upon which the relative addressing scheme hinges.

Referring to FIG. 2, database system 101 (not shown) associates tablespace numbers (TSNs) 9 and 8 with tablespaces 130 and 140, respectively. When database system 101 defines a tablespace, it associates a tablespace number with the tablespace. Within a given database system, a tablespace number uniquely identifies a tablespace.

Within a tablespace, database system 101 associates a tablespace-relative file number (TRFN) with each data file in a tablespace. For a given data file in a tablespace, a tablespace-relative file number is unique relative to other data files in the tablespace, but not to other data files in other tablespaces. For tablespace 130, the tablespace-relative file numbers assigned to data files 130-1, 130-2, 130-3 and 130-4 are 1, 2, 3 and 4, respectively. For tablespace 140, the tablespace-relative file numbers assigned to data files 140-1, 140-2, 140-3 and 140-4 are 1, 2, 3 and 4, respectively.

Database system 101 associates a control file with each tablespace. For each tablespace, the control file maps a tablespace-relative file number to a database-relative file number, and hence maps a data file within a tablespace to a database-relative file number. Control file 210 is associated with tablespace 130, while control file 220 is associated with tablespace 140. Control file 210 includes two fields: (1) tablespace-relative file number 212 ("TRFN 212") and database-relative file number (DRFN 214), (2) and entries 210-1 through 210-4, which each contain a value for TRFN 212 and DRFN 214. Entry 210-1 maps tablespace-relative file number '1' to database-relative file number '12'. Control file 220 is structured similarly relative to tablespace 140.

Any data file in a tablespace can be identified by a tablespace number and a tablespace-relative file number. For example, a "data block pointer" in an index entry refers to the data block containing a particular row. The data block resides in data file 130-1. The data block pointer contains the value '9' as the tablespace reference number and the value '1' as the tablespace-relative file number, thereby identifying tablespace 130 and data file 130-1. The data file can be identified using the following procedure. Given the tablespace number and tablespace-relative file number, the control list associated with the tablespace-relative file number is accessed to find the database-relative file number mapped to the tablespace-relative file number. In control file 210, entry 210-4 maps the tablespace-relative file number '4' to database-relative file number 42, which identifies data file 130-4.

Transporting data files between database systems is not only facilitated by use of a relative addressing scheme, but also by use of self contained tablespaces. A set of tablespaces is self contained when there are no references to any data item in the set that refer to any data item outside the set. For example, if the tablespace holds data for an index of a table in another tablespace, then the tablespace is not self contained. If a set of tablespaces is not self-contained, several measures may be used to render the tables self contained. The data in the tablespace may be modified to make the set of tablespaces self contained. In addition, the makeup of the set of tablespaces can be modified by, for example, removing tablespaces from the set or adding additional tablespaces.

Database metadata 110 stores data mapping tablespace numbers to tablespaces, data files to database-relative file numbers, and, for a particular tablespace, tablespace-relative file numbers to database-relative file numbers of data files. When database system 101 is configured to access a data file, database system 101 generates a new database-relative file number for the file and updates database metadata 110 accordingly. When database system 101 is configured to access a data file as part of a tablespace, database system 101 generates for the data file a new tablespace-relative file number that is unique relative to other data files in the tablespace and updates database metadata 110 accordingly.

It should be understood that the present invention is not limited to any particular technique for transportable tablespaces, or any technique for integrating data files from a database system into another database system.

Multi-Sized Data Block Database Systems

To integrate a tablespace into a database system that stores data in data blocks of a different size than those of the tablespace, the database system should support data blocks of different sizes. A database system that supports multi-size data blocks may have several capabilities. These include the capability to manage a buffer cache that can store copies of different sized data blocks, and the capability to generate undo records for data that is stored in different sized data blocks.

Figure 3:
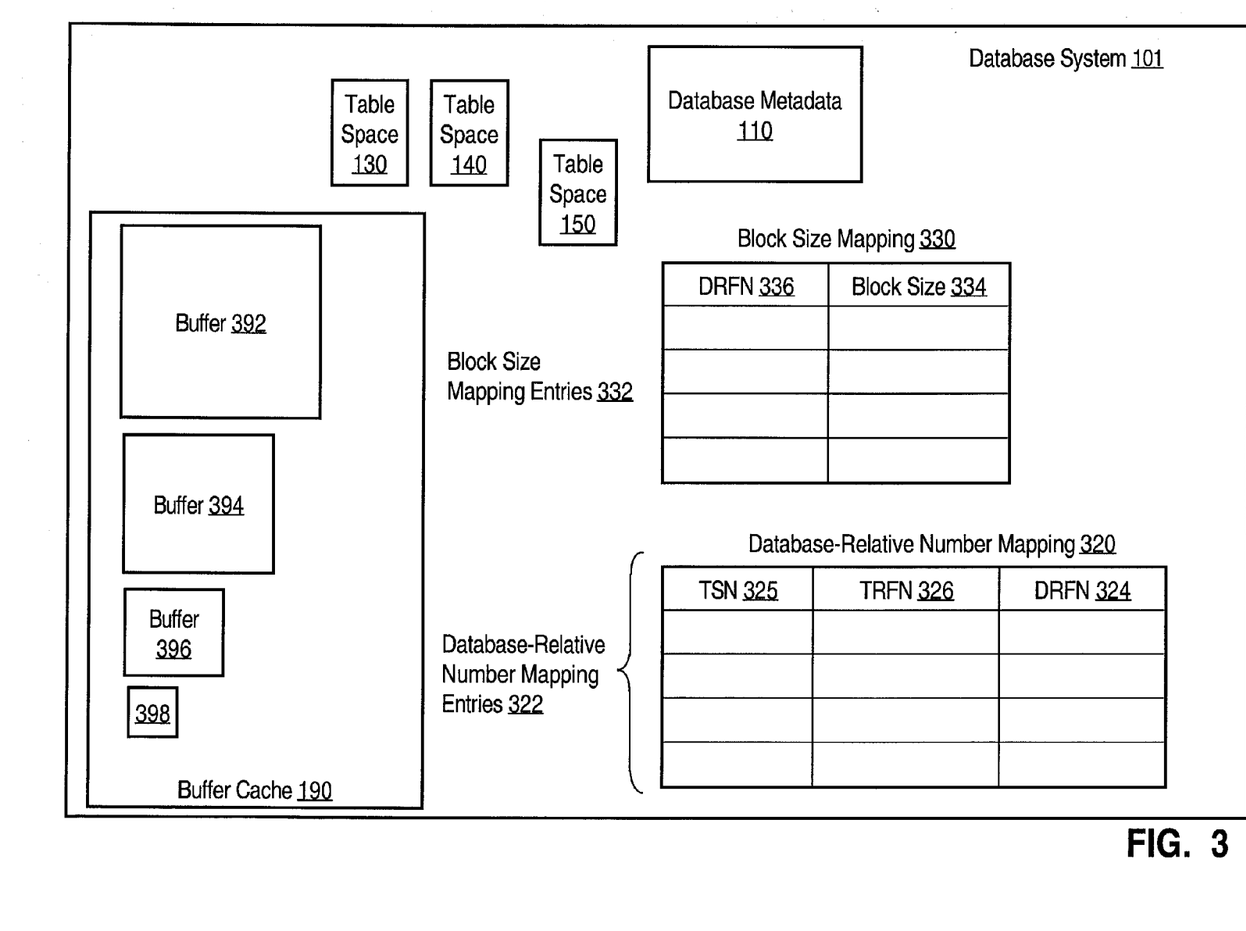
FIG. 3 is a block diagram of structures used to support a buffer cache system that handles multiple size data blocks according to an embodiment of the present invention.

FIG. 3 depicts components of database system 101 used to manage caching different sized data blocks in buffer cache 190. Referring to FIG. 3, buffer cache 190 has buffers of different sizes for storing data blocks of different sizes: buffer 392 has block size A, buffer 394 has block size B, buffer 396 has block size C, buffer 398 has block size D. A buffer in buffer cache 190 may be any of a number of discrete data block sizes defined by database metadata 110. Database system 101 may also define a default data block size to use as shall be further described.

According to an embodiment of the present invention, all data blocks within a tablespace have the same size. When a user submits DDL commands to define a tablespace, the commands may include a parameter that specifies the data block size of data blocks in the tablespace. If no size is specified for the tablespace, then the default data block size is the data block size for the tablespace.

Block size mapping 330 is used to map data files to data block sizes. Specifically, block size mapping 330 maps the "database-relative" file number of a data file to the block size of data blocks contained in the data file. Block size mapping 330 includes block size mapping entries 332 and columns database-relative file number 336 and block size 334. An entry in block size mapping entries 332 maps the database-relative file number value in column database-relative file number 336 to the block size value in block size 334.

Database-relative number mapping 320 maps the tablespace number and tablespace-relative file number of a data file to the database-relative number of the data file. Database-relative number mapping 320 includes database-relative number mapping entries 322 and columns tablespace number 325, tablespace-relative file number 326, and database-relative number 324. An entry in database-relative number mapping entries 322 maps the pair of values in columns tablespace number 325 and tablespace-relative file number 326 to the database-relative number in database-relative number 324.

Database system 101 may use both the database-relative number mapping 320 and block size mapping 330 to determine what size buffer is needed to store a data block before reading a data block from static storage. Given a tablespace number and tablespace-relative number of a data file, the block size can be found by initially examining database-relative number mapping 320 to find the database-relative number. From the database-relative number, the block size can be determined by examining block size mapping 330.

For example, database system 101 receives a request to read a data block DBR pointed to by data block pointer R. Data block pointer R specifies the tablespace number and tablespace-relative file number of the tablespace and data file containing the data block, and an offset indicating where the data block begins within the data file. Database system 101 examines the database-relative number mapping 320 and block size mapping 330 to determine that blocks size C is the data block size of the data block DBR. Database system 101 then loads the data block from static storage into a buffer in buffer cache 190 of block size C.

Likewise, a data block pointer may contain a database-relative file number. Database system 101 uses only block size mapping 330 to determine the block size for the buffer needed to store the data block referred to by the data block pointer.

Undo Records for Multiple-Sized Data Block Database Systems

As mentioned previously, undo entries contain the data ("undo data") needed to undo a change made by database operations. More data blocks may be needed to store undo data than are needed to store the data that has been changed. There are at least several causes for this. First, in terms of storage space needed to store data, the amount of undo data may be inherently greater than the amount of changed data. In other words, a change to all user data in one data block of size X may require more undo data than can be stored in one data block of the same size X.

Second, the changed data is stored in data blocks that have a greater size than the data blocks used to store the undo log. Specifically, in database system 101, tablespace 150 holds log file 150. Tablespace 150 may be configured for data block sizes that are less than the data block size for which tablespace 130 is configured. Because of the difference in data block sizes, undo data for a data block in tablespace 130 may require more data blocks in tablespace 150 than would be needed if the data block sizes for the tablespaces were equal.

For changes made to a particular data block for a transaction, database system 101 is configured to store undo data in more than one data block. This feature allows database system 101 to handle differences in sizes between the undo data and the corresponding changed data, whether the size of the undo data is inherently greater than that of the changed data, or is stored in data blocks smaller in size than the data blocks that store the changed data.

Integrating Tablespaces from Another Database System

Figure 4:
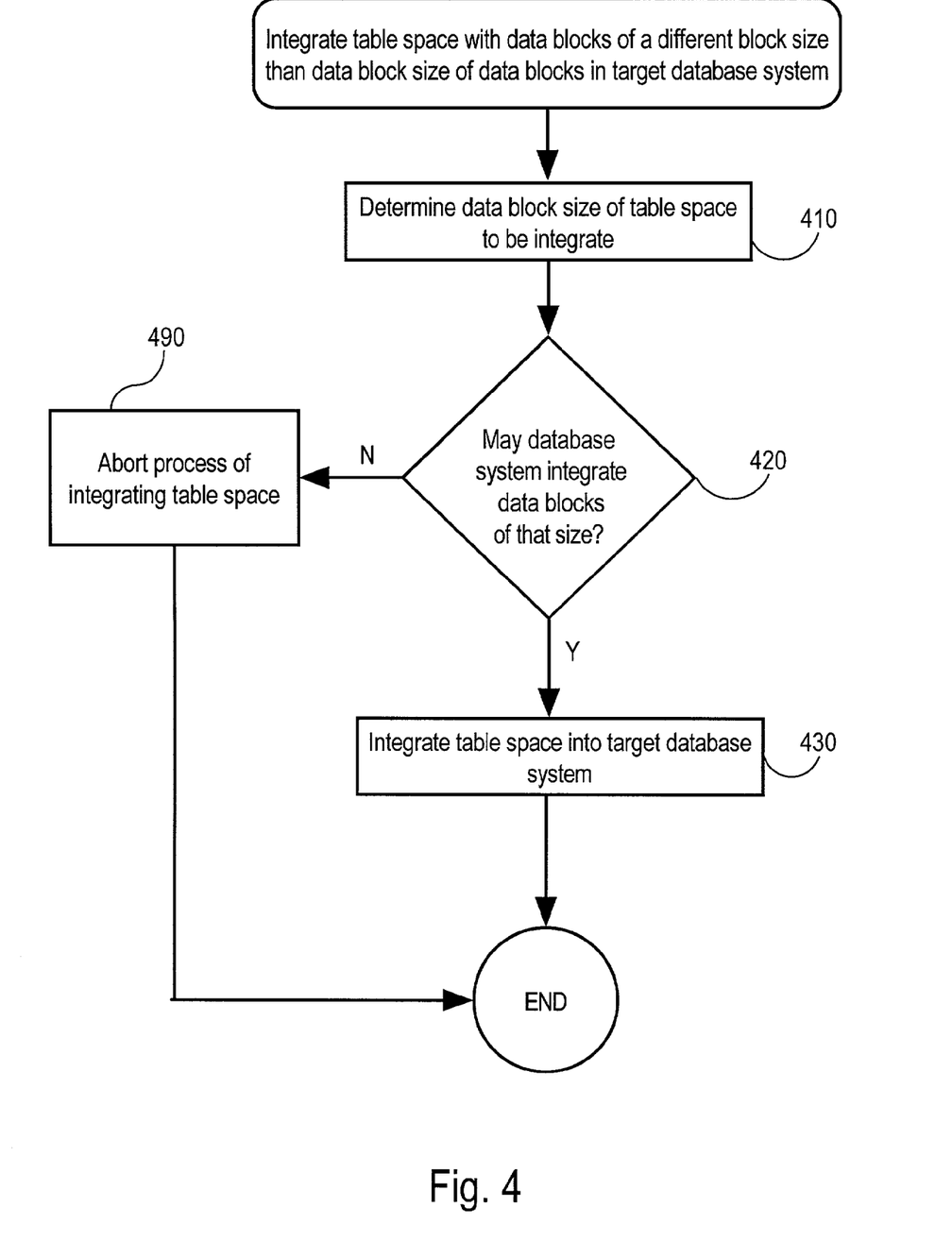
FIG. 4 is a flow chart depicting a process for integrating a tablespace into a database system, where data blocks in the tablespace and data blocks in the database system have different block sizes according to an embodiment of the present invention.

FIG. 4 is a flowchart depicting the steps of a process for integrating a tablespace into a target database system from a source database system, where the tablespace includes data blocks that have a different data block size than at least a subset of data blocks used by the target database system to store data. The process is illustrated using database system 101.

Referring to FIG. 4, at step 410, database system 101 determines the block size of the tablespace to integrate into database system 101. The determination may be made in any of a variety of ways. For example, database system 101 may examine an export control file generated for the tablespace to determine the data block size. Alternately, database system 101 may examine the tablespace, scanning for data structures that mark the boundaries of data blocks, and determining the amount of data that lies within the boundaries. Finally, database system 101 may prompt the user for the data block size.

At step 420, database system 101 determines whether it may integrate a tablespace of the data block size determined at step 410. If database system 101 determines that it cannot integrate a tablespace of the data block size, then execution of the steps proceeds to step 490, where database system 101 aborts the process of integrating the tablespace. Otherwise, execution proceeds to step 430.

The determination of whether a database system 101 may integrate a tablespace of the data block size may be made using a variety of techniques. If database system 101 supports discrete data block sizes defined by database metadata 110, then database system 101 examines the database metadata to determine whether the data block size in question is one of the supported discrete block sizes. If database system 101 is hard coded to support discrete block sizes, then database system 101 may simply be hard coded to compare the data block size in question to one of the supported discrete block sizes.

At step 430, the database system 101 integrates the tablespace into database system 101. The tablespace is integrated using any of the techniques for integrating tablespaces into database systems discussed earlier.

The techniques for transporting data blocks of a given size to a database system having data blocks of a different size offer advantages over conventional techniques for transporting data between database systems. Use of transportable tablespaces allows data to be moved between databases much more quickly than conventional techniques for importing data. Furthermore, because the data blocks in the tablespace do not have to be the same size as that of the data blocks of a target database, the target database is not restricted to using the same data block size as the source database, and may be configured to use data block sizes that are optimal for the target database. For example, a data warehouse may be configured to hold data in bigger data blocks than OLTP source databases.

Of course, if transported data remains in the tablespaces used to transport the data, data contained therein may be stored in data blocks of a size that is not optimal for the target database. However, it is not necessary that transported data remain in the tablespace used to transport the data.

Once a tablespace is integrated, data from the tablespace may be extracted and loaded into a tablespace having an optimal data block size. For example, the tables contained in a transported tablespace, once integrated into a data warehouse, may serve as staging tables. Data from the staging tables is extracted, transformed, and loaded into tables that serve as the primary online repository for the data warehouse. Extracting data from tables internal to a database system is typically performed far more efficiently than extracting data from another database's table.

Hardware Overview

Figure 5:
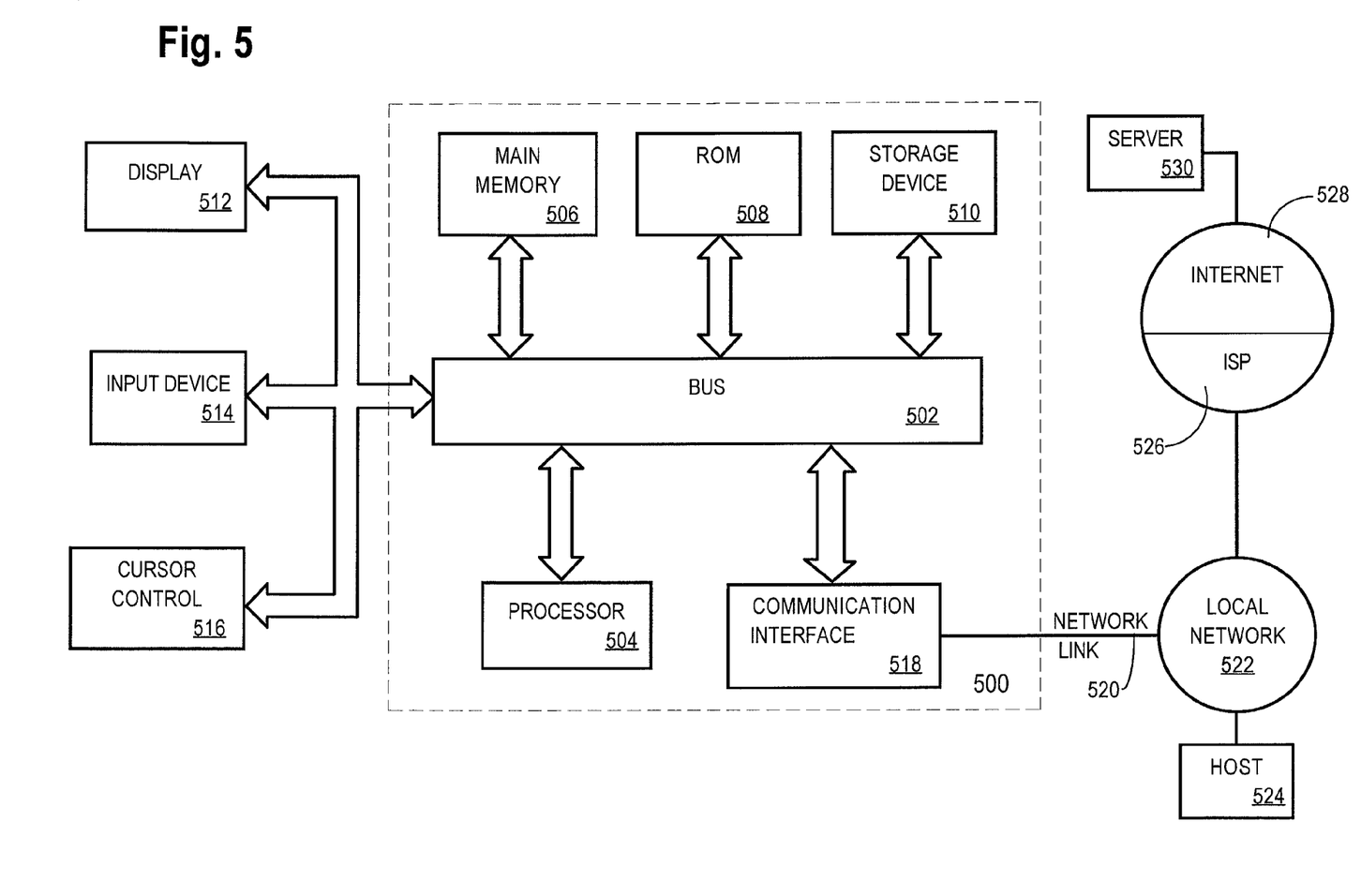
FIG. 5 is a block diagram depicting a computer system that may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 maybe coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for database systems to access data from other database systems, the method comprising the steps of:
   a first database system directly storing first database records in first data blocks having a first data block size;
   concurrently with said first database system directly storing first database records in first data blocks having a first data block size, said first database system directly accessing a copy of second data blocks in which a second database system directly stored second database records;
   said second data blocks having at least one data block with a second data block size different than said first data block size;
   wherein each block of said first data blocks and of said second data blocks is an atomic unit of storage space allocated within a file to store one or more records of a database;

the first database system generating metadata that specifies a plurality of block sizes for data blocks directly accessible to said first database system;

wherein said metadata defines tablespaces and specifies for each tablespace of said tablespaces a particular data block size for data blocks in said tablespace;

integrating said copy of said second data blocks within said first data base system as at least one tablespace that includes said copy of said second data blocks; and wherein the step of integrating includes modifying said metadata to reflect said second data block size for said at least one tablespace.

2. The method of claim 1, wherein the step of accessing a copy of second data blocks includes storing user data in said copy of said second data blocks.

3. The method of claim 1, wherein the method further includes the step of detaching one or more tablespaces from said second database system, wherein said one or more tablespaces include said second data blocks.

4. The method of claim 1, wherein each data block of said copy of said second data blocks has said second data block size.

5. The method of claim 1, wherein said first database system is a data warehouse and said second database system is a source database system for said data warehouse.

6. The method of claim 5, further including the step of integrating said copy of said second data blocks within said data warehouse as a tablespace that includes said copy of said second data blocks.

7. The method of claim 1, wherein said first database system includes a buffer cache in which said first database system stores data blocks of multiple sizes; and wherein said method further includes the step of concurrently storing said first data blocks and said second data blocks in said buffer cache.

8. A computer-readable medium carrying one or more sequences of instructions for database systems to access data from other database systems, wherein execution of the one or more sequences of instructions by one or more processors causes the one or more processors to perform the steps of:

a first database system directly storing first database records in first data blocks having a first data block size;

concurrently with said first database system directly storing first database records in first data blocks having a first data block size, said first database system directly accessing a copy of second data blocks in which a second database system directly stored second database records;

said second data blocks having at least one data block with a second data block size different than said first data block size;

wherein each block of said first data blocks and of said second data blocks is an atomic unit of storage space allocated within a file to store one or more records of a database;

the first database system generating metadata that specifies a plurality of block sizes for data blocks directly accessible to said first database system;

wherein said metadata defines tablespaces and specifies for each tablespace of said tablespaces a particular data block size for data blocks in said tablespace;

integrating said copy of said second data blocks within said first database system as at least one tablespace that includes said copy of said second data blocks; and wherein the step of integrating includes modifying said metadata to reflect said second data block size for said at least one tablespace.

9. The computer-readable medium of claim 8, wherein the step of accessing a copy of second data blocks includes storing user data in said copy of said second data blocks.

10. The computer-readable medium of claim 8, wherein the computer-readable medium further includes instructions for performing the step of detaching one or more tablespaces from said second database system, wherein said one or more tablespaces include said second data blocks.

11. The computer-readable medium of claim 8, wherein each data block of said copy of said second data blocks has said second data block size.

12. The computer-readable medium of claim 8, wherein said first database system is a data warehouse and said second database system is a source database system for said data warehouse.

13. The computer-readable medium of claim 12, further including instructions for performing the step of integrating said copy of said second data blocks within said data warehouse as a tablespace that includes said copy of said second data blocks.

14. The computer-readable medium of claim 8, wherein said first database system includes a buffer cache in which said first database system stores data blocks of multiple sizes; and wherein said computer-readable medium further includes the step of concurrently storing said first data blocks and said second data blocks in said buffer cache.

15. The method of claim 7, wherein said buffer cache comprises first buffers for storing buffers of said first data block size and second buffers for storing buffers of said second data block size; and wherein said first buffers are of a different size than said second buffers.

16. The computer-readable medium of claim 14, wherein said buffer cache comprises first buffers for storing buffers of said first data block size and second buffers for storing buffers of said second data block size; and wherein said first buffers are of a different size than said second buffers.

* * * * *